G. RISCHMULLER.
WHEEL.
APPLICATION FILED OCT. 11, 1919.

1,432,088. Patented Oct. 17, 1922.

Inventor
George Rischmuller,
By W. Schoenborn.
Attorney

Patented Oct. 17, 1922.

1,432,088

UNITED STATES PATENT OFFICE.

GEORGE RISCHMULLER, OF SAN FRANCISCO, CALIFORNIA.

WHEEL.

Application filed October 11, 1919. Serial No. 329,950.

*To all whom it may concern:*

Be it known that I, GEORGE RISCHMULLER, a citizen of the United States of America, residing at San Francisco, in the county of San Francisco and State of California, have invented certain new and useful Improvements in Wheels, of which the following is a specification.

This invention relates to new and useful improvements in wheel constructions adapted for use in connection more especially with automobiles and the like.

An object of this invention is to provide a metallic wheel construction which can be adjusted and kept rigid at all times, and in carrying this out I employ a separate felly and spokes and a two part hub, the parts of which are adapted to be drawn axially toward each other in a manner to force the spokes into tight engagement with the hub parts and felly and keep the wheel rigid.

A further object of the invention is to provide a wheel construction which is simple and inexpensive to manufacture and can be easily and quickly assembled and adjusted when desired.

With the above and other objects in view, this invention resides in the novel features of construction, formations, combinations, and arrangement of parts to be hereinafter more fully described and particularly pointed out in the appended claims.

Figure 1:
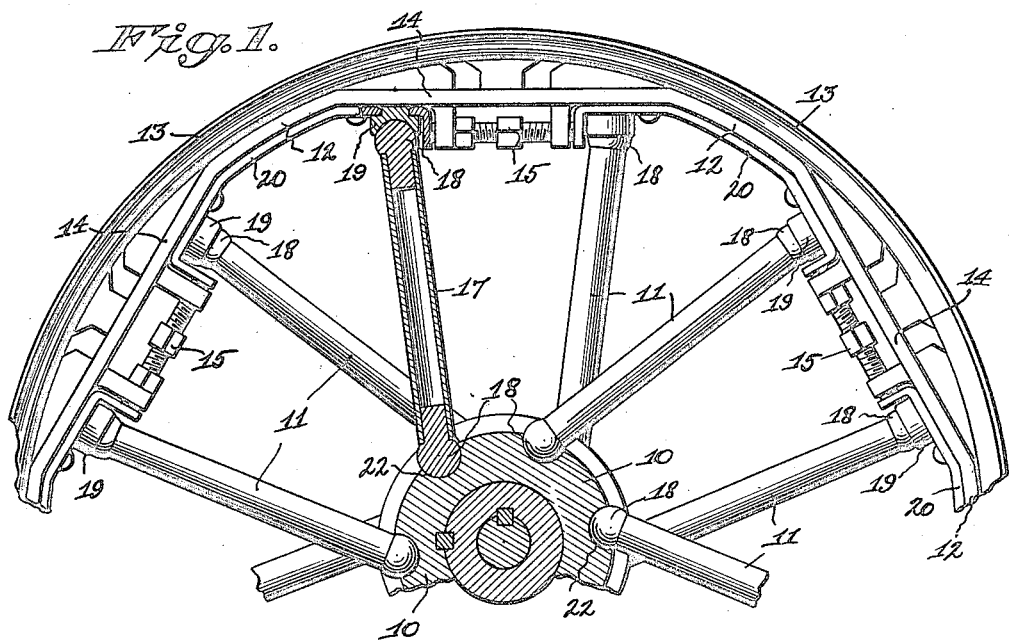
Figure 2:
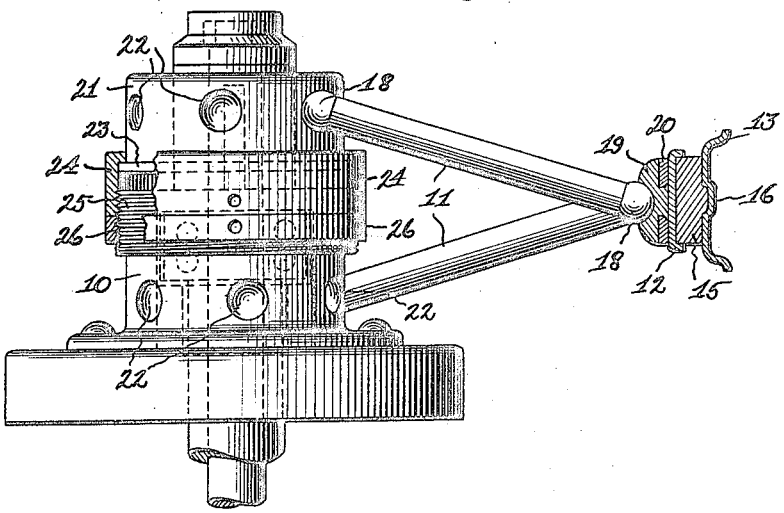

In the drawings, in which similar reference characters designate the same parts in the figures, Figure 1 is a side elevation partly in section of my improved wheel construction, and Figure 2 is a plan of the hub showing two spokes in position and a section of the felly and rim.

Referring to the drawings, the numeral 10 designates in general the hub of the wheel having spokes 11 and felly 12 upon which is mounted a rim 13. The felly 12 is flattened at intervals as at 14 and adapted for receiving locking devices 15, and the rim is provided with a circumferential groove 16 adapted to coact with the locking devices to maintain the rim in position on the felly, as fully illustrated and set forth in my co-pending application Serial No. 329,949, filed concurrently with the present case.

The spokes 11, as more particularly illustrated in Figure 1, are made from steel tubing 17 provided with round heads 18, which can be forged like a rivet and fastened in the tubes 17. Sockets 19 for the heads can be forged in the same way and secured to the felly. In case a demountable rim is used they are riveted to the plates 20, which are firmly riveted to the felly and the ends of which form trusses for the bolts of the rim locking devices.

The hub 10 is provided with a sleeve 21 and in both members are drilled holes to form sockets 22 for receiving the inner ends of the spokes 11. Said sockets 22 are so spaced that the spokes 11, brace each other when the sleeve 21 is drawn toward the hub 10. Said sockets 22 are so spaced that the spokes 11 brace each other axially as well as radially when the sleeve 21 is drawn towards the hub as shown, and this arrangement produces a construction in which there is no lateral strain on the spokes but only end thrust and the spokes being all of the same length—enables a wheel to be constructed, assembled or repaired with a minimum of cost. The sleeve 21 is provided with a flange 23 which is engaged by a threaded coupling member 24 adapted to be screwed upon a threaded portion 25 of the hub. A lock nut 26 is also provided for locking the coupling member 24 when it has been properly positioned, as shown in Figure 2.

The operation of my device is as follows: In order to assemble a wheel, the hub 10 and sleeve 21 are separated sufficiently so that the spokes 11 can be placed in the sockets 22, as shown, then the sleeve is drawn up by the coupling 24 until the spokes are all tight, after which the lock nut 26 can be used to fasten the coupling 24 in place. In case the spokes become loose the wheel can be made rigid again by loosening the lock nut 26, and tightening the coupling 24. The operation of the rim locking device is fully set forth in the copending application heretofore referred to and forms no part of the present invention.

From the foregoing disclosures, taken in connection with the accompanying drawings, it will be manifest that a wheel construction such as described is provided, which will fulfill all the necessary requirements of such a device, it being understood that various minor changes in the specific details of construction can be resorted to within the scope of the appended claims without departing from or sacrificing any of the advantages of the invention.

What I claim is:—

1. A wheel construction comprising a hub having a series of spaced sockets, a sleeve having a series of spaced sockets and movable with respect to said hub, a felly having sockets, spokes of equal length and having heads at their ends adapted to be seated in the sockets of said hub, sleeve and felly, said spokes seated in the hub being oppositely inclined or disposed with respect to the spokes seated in the sleeve, and a coupling member encircling the hub and interposed between the inner ends of the spokes and engaging the sleeve and hub to draw the sockets of said sleeve and hub toward each other and thereby firmly secure and lock said spokes in the sockets of said felly, sleeve and hub so that said spokes brace each other axially.

2. A wheel construction comprising a hub having a series of sockets and a screw threaded section, a flanged sleeve having a series of sockets and movable with respect to said hub, a felly having a series of sockets, spokes of equal length and having heads at their ends adapted to be seated in the sockets of said hub, sleeve and felly, said spokes seated in the hub being oppositely inclined or disposed with respect to the spokes seated in the sleeve, and a threaded coupling member encircling the hub and interposed between the inner ends of the spokes and engaging the flange of the sleeve and threaded section of the hub to draw the sockets of said sleeve and hub toward each other and thereby secure and lock said spokes in the sockets of said felly, sleeve and hub so that said spokes brace each other axially.

In testimony whereof I affix my signature.

GEORGE RISCHMULLER.